United States Patent [19]
Giammalvo

[11] 3,939,338
[45] Feb. 17, 1976

[54] COMBINED TERRARIUM AND LAMP

[75] Inventor: Nicholas A. Giammalvo, New York, N.Y.

[73] Assignee: The Raymond Lee Organization, Inc., a part interest

[22] Filed: Jan. 8, 1975

[21] Appl. No.: 539,260

[52] U.S. Cl.............................. 240/10 P; 240/81 R
[51] Int. Cl.².................... F21S 13/12; F21V 33/00
[58] Field of Search..... 240/10 P, 2 LC, 52.6, 81 R, 240/81 BS, 81 BA

[56] References Cited
UNITED STATES PATENTS

| | | | |
|---|---|---|---|
| 1,449,772 | 3/1923 | Miller | 240/2 LC |
| 1,788,058 | 1/1931 | Jyumi | 240/10 P |
| 2,060,005 | 11/1936 | Fletcher et al. | 240/10 P X |
| 2,141,769 | 12/1938 | Simpson | 240/2 LC |
| 2,167,458 | 7/1939 | Lieberman | 240/81 R |
| 2,709,217 | 5/1955 | McCluskey | 240/2 LC |
| 3,025,392 | 3/1962 | Worth | 240/81 R |
| 3,374,345 | 3/1968 | Schafer | 240/10 P |

FOREIGN PATENTS OR APPLICATIONS

| | | | |
|---|---|---|---|
| 1,051,149 | 9/1953 | France | 240/10 R |
| 850,769 | 9/1939 | France | 240/2 LC |
| 854,306 | 11/1960 | United Kingdom | 240/2 LC |

*Primary Examiner*—Joseph F. Peters, Jr.

[57] ABSTRACT

A lamp contains one or more top mounted incandescent lamps which are used for illumination in conventional manner. The lamp uses a terrarium as a base. The terrarium has a bottom section containing one or more incandescent lamps which are always lit and illuminate the terrarium from below.

3 Claims, 4 Drawing Figures

U.S. Patent  Feb. 17, 1976  3,939,338
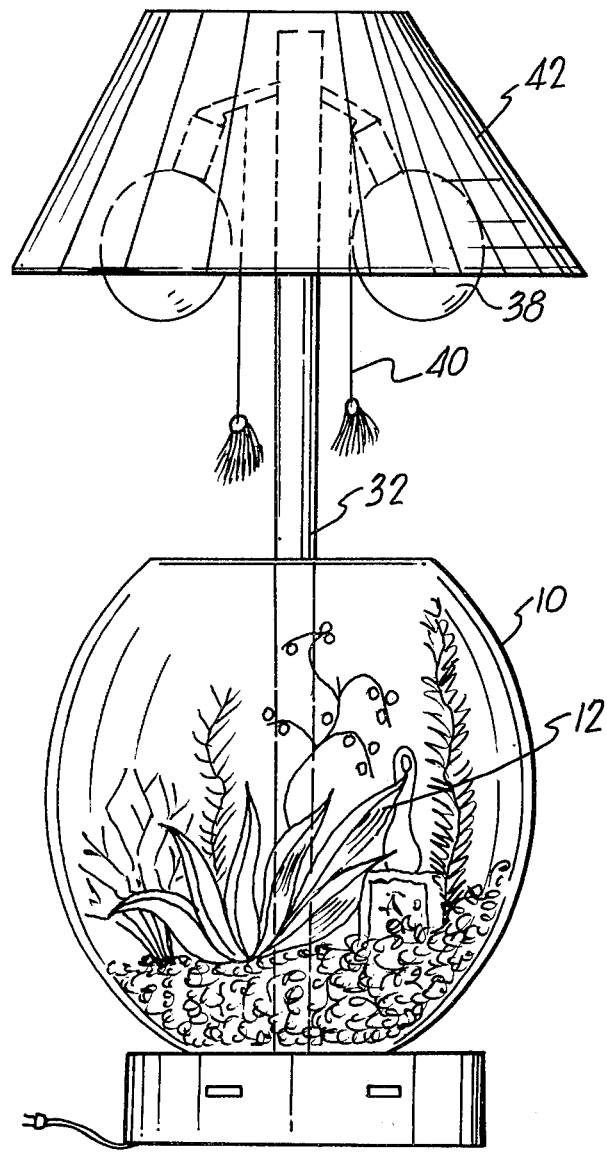
FIG. 1
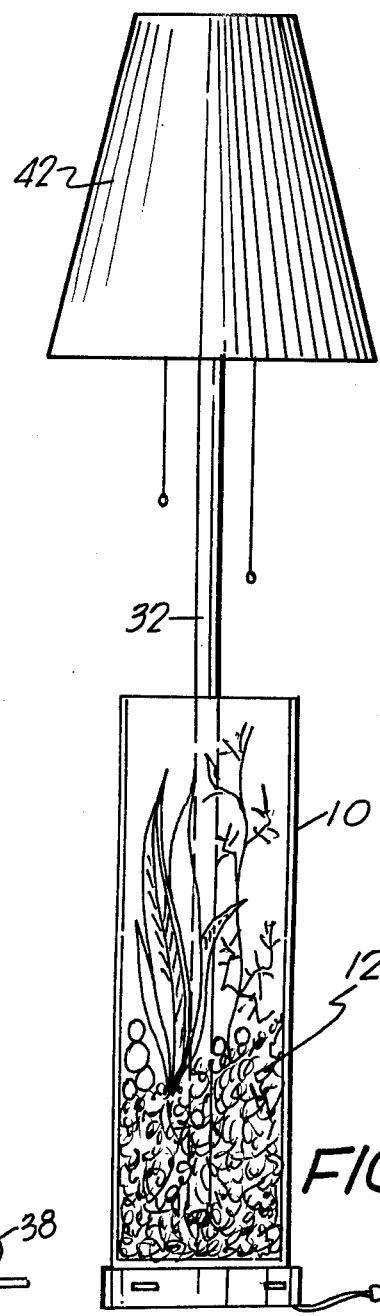
FIG. 2
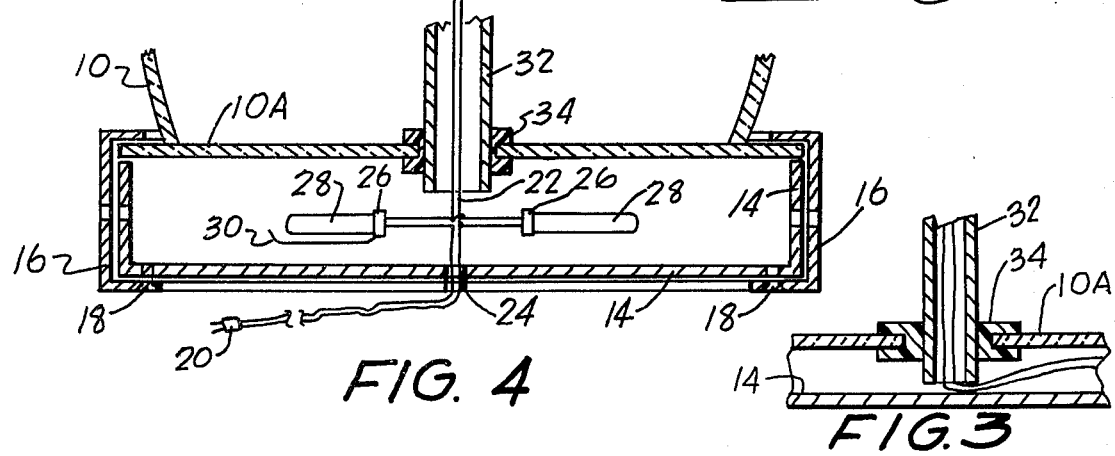
FIG. 4
FIG. 3

COMBINED TERRARIUM AND LAMP

SUMMARY OF THE INVENTION

This invention is directed toward a combined terrarium and lamp which not only provides the utilitarian function of illumination but also provides the visual beauty and ornamental effect of the terrarium.

To this end, a transparent bowl containing a terrarium employs a bottom section containing one or more incandescent light sources. These sources are always lit when the lamp is energized and direct light upward through the bowl whereby the terrarium appears to supply its own illumination. Light from these sources cannot be directed for any other use and these sources are concealed from view.

A hollow conductor carrying post extends upwardly through the bowl and is surmounted by one or more incandescent light sources which can be turned on or off by separate switches as desired and which provide conventional illumination.

BRIEF DESCRIPTION OF THE DRAWINGS

In the drawings:

FIG. 1 is a front view of an embodiment of the invention;

FIG. 2 is a side view thereof; and

FIGS. 3 and 4 show different detail views of portions of the structure shown in FIGS. 1 and 2.

DETAILED DESCRIPTION OF PREFERRED EMBODIMENTS

Referring now to FIGS. 1 – 4, a bowl 10 contains terrarium 12. The bowl is transparent and formed of glass or plastic. The bottom horizontal portion 10A of the bowl rests upon a broad shallow hollow cylindrical member 14. A retaining ring 16 held in place by screws 18 detachably holds the bowl in position on the member.

A plug 20 is secured to a two conductor cable 22. The cable enters the member via grommet 24 in the bottom thereof and is connected directly to two sockets 26, each of which contains a removable horizontal tubular incandescent light bulb 28. These bulbs are always energized when plug 20 is connected to a source of electricity and, because of the reflectors 30 secured to the sockets, always direct light upwardly through portion 10A to illuminate the terrarium. Member 14 is opaque and no light escapes therethrough.

A vertical hollow ceramic rod 32 sealid into the center of the bowl by a suitable waterproof seal 34 carries the conductor cable 22 upward to additional conventional sockets 36 which contain conventional incandescent light bulbs 38 and pull type switches 40. A shade 42 is supported by the rod. These bulbs 38 can be turned on or off as desired and provide conventional illumination.

While the invention has been described with detailed reference to the drawings, the protection sought is to be limited only by the terms of the claims which follow.

I claim:

1. A lamp comprising:

a transparent bowl containing a terrarium; said bowl having a horizontal bottom portion;

first means supporting the bowl and containing at least one first light source positioned to illuminate the terrarium from below, said first means including a shallow hollow vertical cylinder open at its top end, said portion resting on said top end, and a retaining ring securing said portion to said cylinder;

a hollow vertical rod sealed in the bowl and extending outward therefrom;

a least one second light source secured to the top of the rod and provided with an on-off switch; and second means including a two cable conductor extending into the first means, connected directly to the first source, extending through said rod and connected through said switch to said second source to supply electrical energy to all of said sources.

2. The lamp of claim 1 wherein said cylinder is opaque.

3. The lamp of claim 2 wherein all of said sources are of incandescent type.

* * * * *